United States Patent Office 3,489,814
Patented Jan. 13, 1970

---

3,489,814
ADDUCTS OF TETRABROMODIALKOXY CYCLOPENTADIENES AND MONOETHYLENICALLY UNSATURATED ORGANIC COMPOUNDS
Richard Garth Pews, Midland, Clare R. Hand, Sanford, and Carleton W. Roberts, Midland, Mich., assignors to The Dow Chemical Company, Midland, Mich., a corporation of Delaware
No Drawing. Filed Apr. 12, 1968, Ser. No. 721,106
Int. Cl. C07c *43/18;* A01n *9/24;* C09k *3/28*
U.S. Cl. 260—611                                   1 Claim

ABSTRACT OF THE DISCLOSURE

The invention concerns new compositions of matter that are the Diels-Adler adducts of tetrabromodialkoxy cyclopentadienes having the general formula $C_5Br_4(OR)_2$ wherein R is an alkyl radical having from 1 to 8 carbon atoms and certain monoethylenically unsaturated organic compounds, e.g. dibromostyrene or acrylonitrile. Said adducts have utility as herbicides and flame-proofing agents.

---

This invention concerns new compositions of matter that are the adducts of tetrabromodialkoxy cyclopentadienes and certain monoethylenically unsaturated organic compounds.

The tetrabromodialkoxy cyclopentadiene starting materials have the general formula

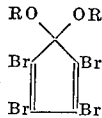

wherein R is an alkyl radical having from 1 to 8 carbon atoms. The compounds are prepared by reacting hexabromocyclopentadiene with an alkali metal alkoxide at temperatures between about 10° and minus 80° C. and at atmospheric pressure or thereabout. The reaction is illustrated by the equation for the dimethoxy compound as follows:

$$C_5Br_6 + 2NaOCH_3 \rightarrow C_5Br_4(OCH_3)_2 + 2NaBr$$

Other dialkoxy compounds are prepared by employing the corresponding alkali metal alkoxide, e.g., sodium ethoxide, potassium propoxide, sodium butoxide, sodium hexoxide or potassium octoxide, in the reaction with hexabromocyclopentadiene to form the corresponding derivatives.

The tetrabromodialkoxy cyclopentadienes undergo the Diels-Alder reaction with certain ethylenically unsaturated organic compounds to form other new compositions of matter.

We have found that the tetrabromodialkoxy cyclopentadienes having the above formula react with ethylenically unsaturated compounds such as 2,5-dibromostyrene, acrylonitrile, allyl alcohol and maleic anhydride to form the corresponding dienophiles.

The reaction can be carried out at temperatures between about 80° and 200° C. and at atmospheric or superatmospheric pressure.

The new compositions are useful as the active ingredient of spray compositions for the control of pig weed. They are also useful as flame-proofing agents and as fire retardants when incorporated with flammable plastics such as polystyrene or polyethylene, or with paper or cellulose or cotton linters or cotton cloth.

The following examples illustrate ways in which the invention can be practiced, but are not to be construed as limiting its scope.

EXAMPLE 1

A charge of 13 grams of 2,5-dibromostyrene and 22.1 grams of 1,2,3,4-tetrabromo-5,5-dimethoxy cyclopentadiene were placed in a glass reaction vessel equipped with a reflux condenser, and 250 ml. of ortho xylene was added. The mixture was heated at reflux for 72 hours. Thereafter, the xylene was removed under vacuum. The residue was dissolved in a mixture of equal parts by volume of ethyl acetate and hexane, and was recrystallized therefrom. There was obtained 29.9 grams of a white crystalline product melting at 166–167° C. It was analyzed and found to contain:

Theory $C_{15}H_{12}Br_6O_2$: C, 25.56; H, 1.72; $Br_2$, 68.17. Found: C, 26.00; H, 1.72; $Br_2$ 68.20.

The compound has the formula

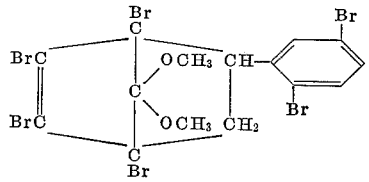

In tests of the compound as the active ingredient in spray compositions for the control of pig weed it was found to give 100 percent kill in a concentration of 10 parts by weight of said compound per million parts of the spray composition. It is also found to be useful as a flame-proofing and fire-retarding agent in styrene polymers, e.g. polystyrene.

EXAMPLE 2

A charge of 10 grams of tetrabromodimethoxycyclopentadiene similar to that used in Example 1, and 5 ml. of acrylonitrile were sealed in a glass tube and heated under time and temperature conditions as follows: 1 hour at 140° C.; 1 hour at 160° C.; and 1 hour at 190° C. After cooling the product was recovered. There was obtained 6 grams of crystalline product melting at 95–96° C. It was analyzed and found to contain:

Theory $C_{10}H_9Br_4O_2N$: C, 24.24; H, 1.83; Br, 64.64. Found: C, 24.30; H, 1.78; Br, 64.85.

The compound has the structure

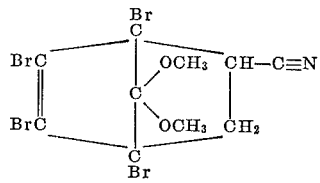

In tests of the compound as the active ingredient in spray compositions for control of pig weed it was found to give 100 percent kill at a concentration of 10 parts per million parts of the spray composition.

EXAMPLE 3

A charge of 10 grams of tetrabromodimethoxycyclopentadiene similar to that used in Example 1 and 10 ml. of allyl alcohol were sealed in a glass tube and heated at 140° C. for one hour. Thereafter it was heated up to 200° C. in a period of one hour and maintained at 200° C. for 30 minutes, then was cooled. The product was recovered and crystallized from hexane. There was obtained 4 grams of crystalline product melting at 89–90° C. It was analyzed and found to contain:

Theory $C_{10}H_{12}Br_4O_3$: C, 23.10; H, 2.42; Br, 63.99.
Found: C, 24.30; H, 2.38; Br, 63.4.

The compound has the structure

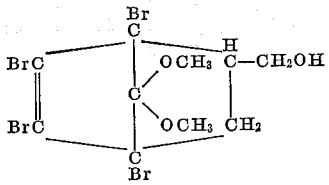

In tests of the compound as the active ingredient in spray compositions for control of pig weed it was found to give 100 percent kill at a concentration of 10 parts by weight per million parts of the spray composition. It is also useful as a starting material to make other chemical compounds, e.g. by reacting with acrylic or methacrylic acid to form the corresponding esters.

EXAMPLE 4

A charge of 15 grams of tetrabromodimethoxycyclopentadiene similar to that used in Example 1 and 3.5 grams of maleic anhydride were placed in a glass reaction vessel, together with 125 ml. of toluene. The mixture was heated with refluxing for 2 hours. The product was recovered and was washed with carbon tetrachloride and was dried. There was obtained 10 grams of product as a white solid melting at 244–245° C. It was analyzed and found to contain:

Theory $C_{11}H_8Br_4O_3$: C, 24.44; H, 1.49; Br, 59.25.
Found: C, 24.60; H, 1.45; Br, 59.10.

The compound has the structure

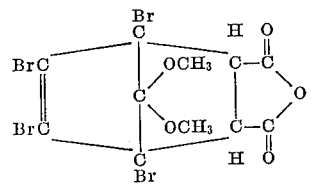

In tests of the compound as the active ingredient in spray compositions for control of pig weed it was found to give 100 percent kill at a concentration of 10 parts by weight per million parts of the spray composition. The compound is also useful in the preparation of polyesters by reaction with ethylene glycol or propylene glycol. It is also useful as a flame retardant in flammable materials such as paper or cellulose.

We claim:
1. An adduct that is the Diels-Alder reaction product prepared by refluxing a mixture of 1,2,3,4-tetrabromo-5,5-dimethoxycyclopentadiene and 2,5-dibromostyrene.

References Cited

UNITED STATES PATENTS

| | | | |
|---|---|---|---|
| 3,103,539 | 9/1963 | Ordas | 260—611 XR |
| 3,220,988 | 11/1965 | Hoch | 260—611 XR |
| 3,270,089 | 8/1966 | Wygant et al. | 260—611 XR |

OTHER REFERENCES

Roberts: Chemistry and Industry (1958), pp. 110–115.

BERNARD HELFIN, Primary Examiner

U.S. Cl. X.R.

71—88, 105, 122, 124; 252—407; 260—45.7, 45.8, 45.95, 346.6, 464

PO-1050
(5/69)

UNITED STATES PATENT OFFICE
CERTIFICATE OF CORRECTION

Patent No. 3,489,814                Dated January 13, 1970

Inventor(s) Richard Garth Pews et al

It is certified that error appears in the above-identified patent and that said Letters Patent are hereby corrected as shown below:

In Col. 3, remove line 10, "pentadiene similar to that used in Example 1 and 10 ml.", and insert it after line 4.

SIGNED AND
SEALED
JUL 14 1970

(SEAL)
Attest:

Edward M. Fletcher, Jr.
Attesting Officer

WILLIAM E. SCHUYLER, JR.
Commissioner of Patents